United States Patent [19]
Walker et al.

[11] 3,886,043
[45] May 27, 1975

[54] PROCESS FOR PREPARING PURE PORCINE BETA-TRYPSIN

[75] Inventors: John Walker; Borivoj Keil, both of St. Remy Les Chevreuse, France

[73] Assignee: Choay S.A., Paris, France

[22] Filed: Aug. 22, 1973

[21] Appl. No.: 390,340

[30] Foreign Application Priority Data
Aug. 24, 1972  France .............................. 72.30127
Aug. 14, 1973  France .............................. 73.29620

[52] U.S. Cl. ............................................. 195/66 R
[51] Int. Cl. ............................................ C07g 7/026
[58] Field of Search ....................... 195/62, 65, 66 R

[56] References Cited
OTHER PUBLICATIONS
*Methods in Enzymology* Vol. 19, pp. 49–52, (1970).

*Primary Examiner*—Lionel M. Shapiro
*Attorney, Agent, or Firm*—Fleit & Jacobson

[57] ABSTRACT

A method of preparing pure porcine $\beta$-trypsin by purifying commercial crystallized porcine trypsin through chromatography on sulfonated ion exchangers of a solution of this trypsin in a buffer whose elution coefficient is equivalent to that of a buffer of tris(hydroxymethyl)aminomethane when the latter has a resistance greater than $0.21 \times 10^3$ Ohm and preferably between $0.23 \times 10^3$ Ohm and $0.35 \times 10^3$ Ohm. The method is carried out at a pH between 7.0 and 8.2 and at a temperature between 1°C and 4°C. When utilizing this process, the product obtained has a titer of active sites of not less than 90% and generally on the order of 90 to 95%.

8 Claims, 1 Drawing Figure

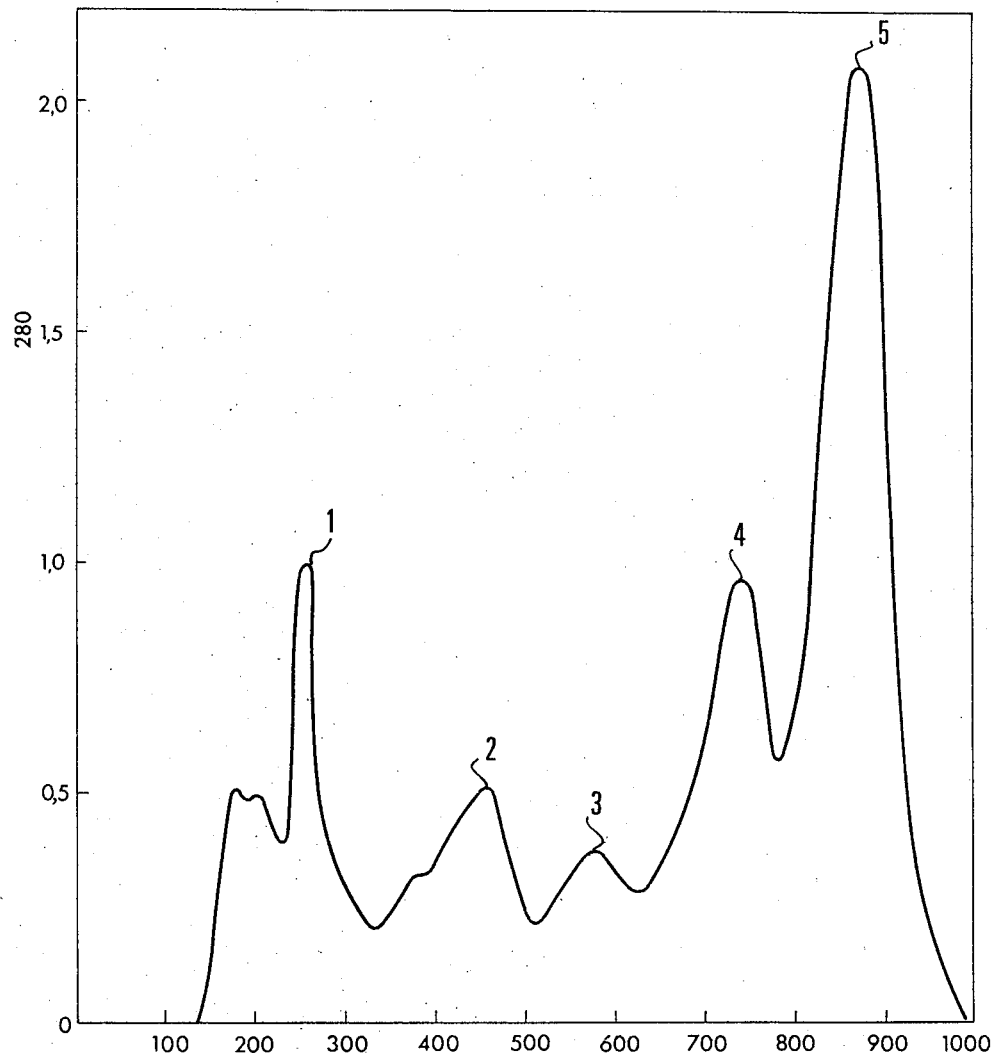

PROCESS FOR PREPARING PURE PORCINE BETA-TRYPSIN

BACKGROUND OF THE INVENTION

This invention concerns a new method of preparing pure trypsin from pigs. Trypsin is an enzyme that has been known for a long time and was discovered and extracted from the bovine pancreas by Kuhne in 1848.

The major part of the work on trypsin and its forerunners was made on trypsin from cattle. Among the effects for obtaining trypsin which is as pure as possible, Northrop and Kunitz first obtained crystallized trypsin from the bovine pancreas in 1948. The progress in purification techniques made it possible to produce trypsin, still from the bovine pancreas, which was considered to have a purity on the order of 100%.

In 1968, Schroeder and Shaw [Duane D. Schroeder and Elliot Shaw, Journal of Biological Chemistry, Vol. 243, No. 11, pp. 2943–2949, 1968] demonstrated that this trypsin which was considered to be pure actually consisted of a mixture of components which were not easily separated, i.e. of several forms of trypsin possessing enzymatic properties of different extents.

The work of Schroeder and Shaw indicated that the known crystallized trypsin consists of a mixture basically including: (a) a non-degraded form of trypsin with high enzymatic activity identified by the authors as $\beta$-trypsin which has a single chain; (b) a $\alpha$-trypsin present in the mixture in lesser quantity and representing a degraded form of the $\beta$-trypsin with a structure having two chains linked to each other by disulphur bridges which results from a gap of the $\beta$-form at the level of lysine 131; (c) other forms of trypsin still more degraded in relation to $\beta$-trypsin than the $\alpha$-trypsin, and specifically a pseudo-trypsin; and (d) remainder a mixture of inactive products.

Schroeder and Shaw were able to separate the components of the mixture known under the name of trypsin by means of chromatography of a solution of bovine trypsin at 10 mg/ml in a buffer of tris(hydroxymethyl)aminomethane chloride (0.10–0.15M), of calcium chloride (0.02M) and of benzamidine hydrochloride (1mM) at a pH close to neutral or 7.1 on a column of sulfoethyl-Sephadex C-50 equilibrated with the above buffer.

Porcine trypsin has also been investigated and this investigation indicated that porcine trypsin is more stable than bovine trypsin and that its composition of aminoacids differs from that of bovine trypsin.

Efforts at obtaining porcine trypsin in a state as pure as possible in view of the art at the time utilized chromatography on carboxymethyl-cellulose. Two methods have been described; the first [M. Charles, M. Rovery, A. Guidoni and P. Desnvelle, Biochim. Biophys. Acta 69 (1963), pp. 115–129] carrying the chromatography out at a pH of 5 with a citrate (0.06M) and CaCl$_2$ (0.01M) buffer while the second [J. Travis and I. E. Kiener, Journal of Biological Chemistry, Vol. 240, No. 5, pp. 1962–1966 (1965)] precedes chromatography at pH 5.5 by a double crystallization. As we now know, the product yielded by these techniques still contained a mixture of the different forms of trypsin.

Elsewhere attempts at applying to porcine trypsin the method of separating the different forms of bovine trypsin developed by Schroeder and Shaw did not make it possible to separate porcine $\beta$-trypsin from its degraded forms as was shown in the report of Y. Jacquot-Armand and M. Hill in FEBS Letters, Vol. 11, No. 4, December 1970.

In "Biochemistry", Vol. 10, No. 14, pp. 2743–2747, 1971, Robinson, Tye, Neurath and Walsh describe a method of separation of bovine $\alpha$- and $\beta$-trypsin by means of chromatography through affinity on a column of chicken ovomucoid linked by covalence to "Sepharose" followed by selective elution of the two fractions by a gradient of pH. This report recommends applying the method to porcine trypsin but the product so obtained is still constituted by a mixture of the active forms.

DESCRIPTION OF THE INVENTION

This invention is intended to provide a process for preparing the non-degraded form of trypsin in the pure state, i.e. pure $\beta$-trypsin, from commercial porcine trypsin.

The subject of this invention is a process of preparing pure porcine $\beta$-trypsin by purifying commercial crystallized porcine trypsin through chromatography on sulfonated ion exchangers of a solution of this trypsin in a buffer whose elution coefficient is equivalent to that of the tris(hydroxymethyl)aminomethane when the latter has a resistance greater than $0.21 \times 10^3$ Ohm and preferably between $0.23 \times 10^3$ and $0.35 \times 10^3$ Ohm. The resistance of the buffer is measured at 20°C in cells of standard type.

In a preferred form of the process of this invention, the process is conducted at a pH between 7 and 8.2. In a further preferred form of the process, the temperature is held between 1°C and 4°C.

In another advantageous variation of the process of this invention, the commercial crystallized porcine trypsin used as starting material is purified on an ion exchanger constituted preferably by sulfoethyl-Sephadex or sulfopropyl-Sephadex ("Sephadex" is the trade name of Company Pharmacia Fines Chemicals AB, Upsala, Sweden and designates dextrane gels in the form of generally spherical particles) and specifically by "SE-Sephadex" C-50 or "SP-Sephadex" C-50.

The process of this invention makes it possible for the first time to separate the different active forms of porcine trypsin and specifically to separate the non-degraded form, i.e. porcine $\beta$-trypsin.

In addition to the preceding processing arrangements, the invention includes other arrangements which will appear from the following description. This invention concerns in particular the processes of preparing pure porcine $\beta$-trypsin which conforms with the preceding arrangements as well as the means suitable for carrying out these processes and the products obtained when utilizing these processes.

The invention will be more easily understood with the aid of the examples which follow below which are given solely as an illustration of the present invention and are not limitative of the same.

EXAMPLE 1

The chromatographic column is a column of SE-Sephadex C-50 which is 70 cm high by 2 cm inside diameter, equilibrated by a buffer at pH 7.1 tris(hydroxymethyl)aminomethane chloride (0.05M), calcium chloride (0.012M) and benzamidine (1mM) which has a resistance of $0.30 \times 10^3$ Ohm. The starting matter is commercial crystallized porcine trypsin (Choay S.A., Paris, France). Its titer of active sites has been determined by the method of Chase and Shaw [Biochem. Biophys. Res. Commun. 29, pp. 508–514, 1967] with the aid of p-nitrophenyl-p'-guanidine benzoate hydrochloride. This specific dose indicates 50% of active sites for the trypsin utilized. The latter is dissolved in the above buffer (50 mg/ml buffer) and this solution is passed through the column at a rate of 10 ml/hr while keeping the temperature of the solution below 4°C. The fractions were collected every 30 minutes. The inactive products are passed out with the dead volume of the column, i.e. with the first 150–300 ml, and are followed by the different degraded forms having enzymatic activity which appear between 300 and 600 ml. Between 600 and 700 ml, α-trypsin arrives and is followed by β-trypsin between 800 and 950 ml. From this fraction (800–950 ml), pure β-trypsin is isolated in the dry state by standard methods.

The product obtained through the above process of this invention and dosed by the method of Chase and Shaw with p-nitro-p'-guanidine benzoate mentioned above indicates a titer of active sites of not less than 90% and generally on the order of 90 to 95%.

Chromatography of commercial crystallized porcine trypsin as defined above and under the conditions here described results, as shown in the attached drawing, in four peaks which indicate trypsin activity, but a chymotrypsin activity was not detected.

Referring to the drawing which represents the elution diagram of commercial crystallized porcine trypsin processed as described, the abscissa represents the volume of the fractions collected expressed in ml, and the ordinate represents the absorbance of the collected fractions measured spectrophotometrically at 280 nm.

Peak 1 between 150 and 300 ml corresponds to the inactive products which issue with these fractions; peaks 2 and 3 correspond to degraded forms of β-trypsin which still possess a certain trypsin activity and issue between 300 and 600 ml; peak 4 corresponds to α-trypsin which issues between 600–650 and 700 ml; and peak 5 corresponds to β-trypsin which issues between 800 and 950 ml.

When the thus collected β-trypsin is again subjected to chromatography (at this point its titer of active sites is not less than 90%), the applicants have been able to show, moreover, that this product does not contain any other active forms such as the α-form.

EXAMPLE 2

A chromatographic column 70 cm high × 2 cm inside diameter was used which is constituted by SE-Sephadex C-50 equilibrated by a buffer at pH 8 containing tris(hydroxymethyl)aminomethane hydrochloride (0.05M), calcium chloride (0.02M) and benzamidine, (1mM) which has a resistance of $0.3 \times 10^3$ Ohm.

A solution of trypsin from the pig is prepared in the above buffer by dissolving commercial crystallized porcine trypsin (Choay S.A., Paris, France) which has a 50% titer of active sites in the buffer at the rate of 50 mg/ml of buffer.

This solution is passed through the column at the rate of 10 ml/hr while keeping the temperature of the solution at less than 4°C. The fractions issuing from the column are collected every 30 minutes. The inactive products issue with the dead volume of the column. The β-trypsin begins to appear at 1,600 ml, in a steep peak, completely separated from degraded forms of trypsin.

By operating at pH 8, there is obtained an excellent separation of β-trypsin from the pig pancreas with a yield on the order of 60 to 70% in relation to the starting matter. The β-trypsin thus separated is isolated in the dry state by standard methods.

The titer of active sites of porcine β-trypsin thus obtained, when dosed by the method of Chase and Shaw [Biochem. Biophys. Res. Comm. 29, pp. 508–514, 1967], is not less than 90% and generally on the order of 90 to 95%.

EXAMPLE 3

A chromatographic column 70 cm high × 2 cm inside diameter was used which is constituted by SP-Sephadex C-50 equilibrated by a buffer at pH 7.1 containing tris-(hydroxymethyl)amionomethane chloride (0.05M), calcium chloride (0.012M) and benzamidine (1mM) which has a resistance of $0.3 \times 10^3$ Ohm.

A solution of porcine trypsin is prepared in the above buffer by dissolving commercial crystallized porcine trypsin (Choay S.A., Paris, France) with a titer of active sites of 50% in this buffer at the rate of 50 mg/ml of buffer.

This solution is passed through the chromatographic column at the rate of 10 ml/hr and the temperature of the solution is kept at less than 4°C.

The fractions issuing from the column are collected every 30 minutes. The inactive products issue with the dead volume of the column, i.e. between 80 and 150 ml, and are followed by different degraded forms with a certain enzymatic activity between 150 and 270 ml. Between 270 and 310 ml, α-trypsin appears and is followed, between 310 and 420 ml, by β-trypsin. The latter is isolated from this fraction in the dry state by standard methods.

The titer of active sites of this β-trypsin is not less than 90% and generally higher than this value.

EXAMPLE 4

By utilizing a chromatographic column with SP-Sephadex C-50 equilibrated by a buffer at pH 8 and with the constitution of the buffer used in Example 2, β-trypsin is separated, in the same way as in Example 2, in fractions which appear later than when operating at pH 7.1. The fractions begin at 800 ml in a steep peak which furnishes a more complete separation between β-trypsin and the degraded forms of the material which are found in the first fractions issuing from the column.

The applicants have demonstrated that the β-trypsin obtained in accordance with this invention includes a single N-terminal group, i.e. isoleucine. The applicants have also proved very clearly that porcine β-trypsin has a single-chain structure and that porcine α-trypsin has a double-chain structure. This has been shown by electrophoresis on polyacrylamide gel in the presence of sodium dodecylsulphate (SDS). The β-form manifests a single band which corresponds to a molecular weight of 24,000, and the α-form exhibits two bands whose migration corresponds to molecular weights about 11,000 and 13,000, respectively, as shown by the following table:

Table

Electrophoresis of Porcine Trypsin On Polyacrylamide Gel

| Proteins | Bands | Migration (mm) | Molecular Wgt. |
| --- | --- | --- | --- |
| Porcine β-trypsin | 1 | 45 | 24,000 |
| Porcine α-trypsin | 2 | 62 | 11,000 (about) |
|  |  | 64 | 13,000 (about) |

The process of this invention makes it possible to obtain pure porcine β-trypsin which could not be done with the processes previously known in the art.

In accordance with the invention, this result is accomplished by utilizing buffers whose ionic energy is appreciably less than that of the buffers suggested previously to this, and whose resistance consequently is much higher than that of the latter.

Specifically, whereas the resistance of the buffers recommended by Schroeder and Shaw is $0.12 \times 10^3$ Ohm, the resistance of the buffers described in the preceding examples is $0.30 \times 10^3$ Ohm.

The preceding description indicates that, regardless of the manner of utilization, execution and application, there now exists a new process of preparing pure porcine trypsin which has important advantages over previously known processes and, specifically permits the utilization of a source of trypsin (pancreatic extracts from the pig) whose use was not possible under the earlier known methods. It further makes it possible to obtain pure trypsin with a stability greatly superior to that of pure trypsin from pancreatic extracts of cattle. Finally, the present invention provides an excellent yield of pure porcine β-trypsin absolutely separated from degraded forms of trypsin.

It is clear from the preceding decription that the invention is by no means limited to the specific examples which have been described. On the contrary, the present invention covers and includes any variations which would come to the mind of a man of ordinary skill in this art, without thereby going beyond the scope of the present invention as defined in the appended claims.

We claim:

1. A process of preparing substantially pure porcine β-trypsin, comprising purifying crystallized porcine trypsin by chromatography on sulfonated ion exchangers of a solution of said crystallized porcine trypsin in a tris(hydroxymethyl)aminomethane buffer which has a resistance greater than $0.21 \times 10^3$ Ohm, and collecting substantially pure porcine β-trypsin in the fractions which issue as the last out of the chromatographic separation and which are essentially free of degraded forms of trypsin.

2. The process of claim 1 in which said tris(hydroxymethyl)aminomethane buffer has a resistance between $0.23 \times 10^3$ and $0.35 \times 10^3$ Ohm.

3. The process of claim 1 in which said process is carried out at a pH between 7.0 and 8.2.

4. The process of claim 1 in which said process is carried out at a temperature between 1°C and 4°C.

5. The process of claim 1 in which said buffer comprises tris(hydroxymethyl)aminomethane, calcium chloride and benzamidine.

6. The process of claim 5 in which said tris(hydroxymethyl)aminomethane is in the form of its chloride.

7. The process of claim 1 in which said sulfonated ion exchanger is a sulfonated dextrane gel ion exchanger.

8. The process of claim 1 in which said sulfonated ion exchanger is a sulfoethyl or sulfopropyl dextrane gel ion exchanger.

* * * * *